A. H. FOX & A. W. LENDEROTH.
AUTOMATIC REVERSING SWITCH.
APPLICATION FILED JUNE 11, 1913.

1,103,405.

Patented July 14, 1914.
2 SHEETS—SHEET 1.

Witnesses:

Inventors
A. H. Fox
A. W. Lenderoth
By their Attorney

A. H. FOX & A. W. LENDEROTH.
AUTOMATIC REVERSING SWITCH.
APPLICATION FILED JUNE 11, 1913.
1,103,405.
Patented July 14, 1914.
2 SHEETS—SHEET 2.
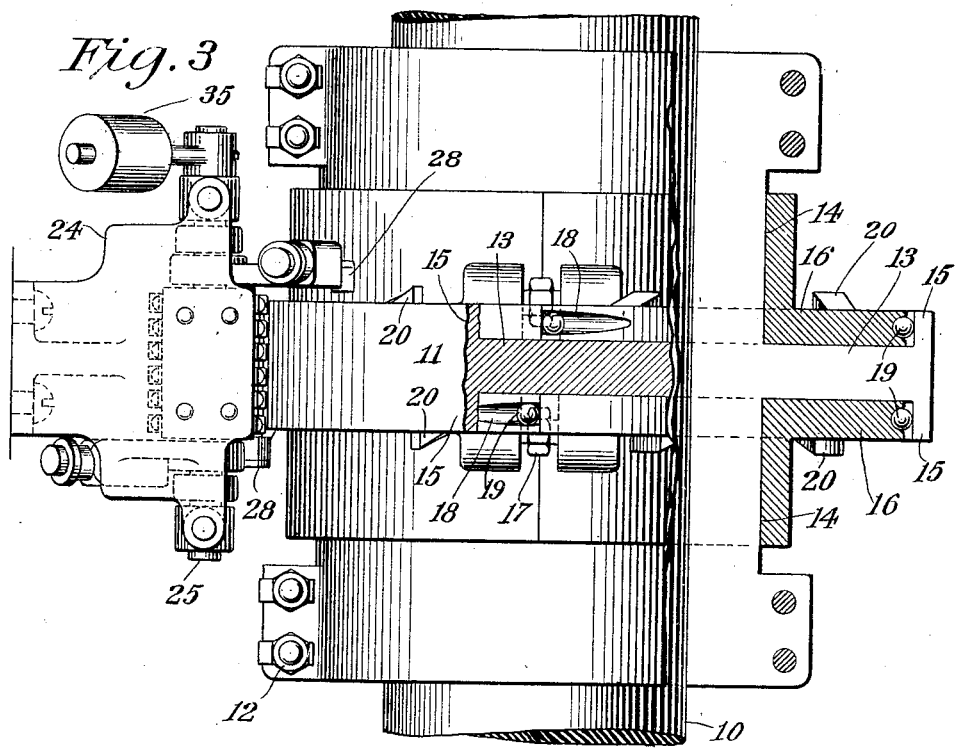
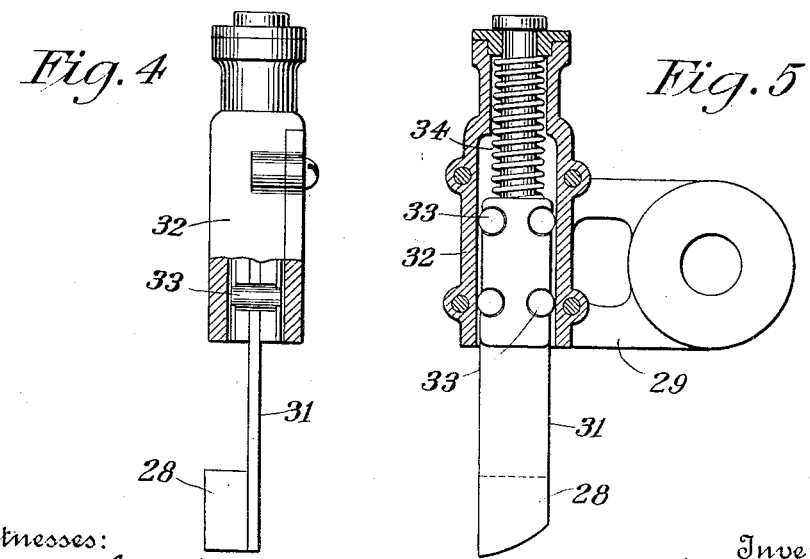

UNITED STATES PATENT OFFICE.

AUSTEN H. FOX, OF NEW YORK, AND ARNOLD W. LENDEROTH, OF STAPLETON, NEW YORK.

AUTOMATIC REVERSING-SWITCH.

1,103,405.  Specification of Letters Patent. Patented July 14, 1914.

Application filed June 11, 1913. Serial No. 773,024.

*To all whom it may concern:*

Be it known that we, AUSTEN H. Fox and ARNOLD W. LENDEROTH, citizens of the United States, residing at New York city, in the county and State of New York, and at Stapleton, in the county of Richmond, and State of New York, respectively, have invented certain new and useful Improvements in Automatic Reversing-Switches, of which the following is a specification.

This invention relates to electrical switches controlled by reversible shafts—for example a switch controlled by a car axle through suitable mechanism which shifts the position of the switch when the direction of movement of the vehicle changes. Switches of this type may be used for making active the one or the other of a pair of electromagnetic detectors located on opposite sides of the vehicle as shown for example in our Patent No. 1,007,192. These switches may also be used to control the connections of a dynamo driven from a car axle and maintain the direction of the current the same regardless of the direction in which the axle rotates.

Prior devices of this kind have been open to certain objections, such as excessive friction and wear, the employment of gearing, etc., which it is our object to avoid. By means of our invention we have aimed to secure a positive shifting movement of the switch during its reversal without having to employ pawls or similar devices which constantly trail over moving teeth when idle, and we have furthermore devised our apparatus so that the switch is capable of being balanced against vibration and adapted to remain in either of the two positions into which it may be moved.

Figure 1:
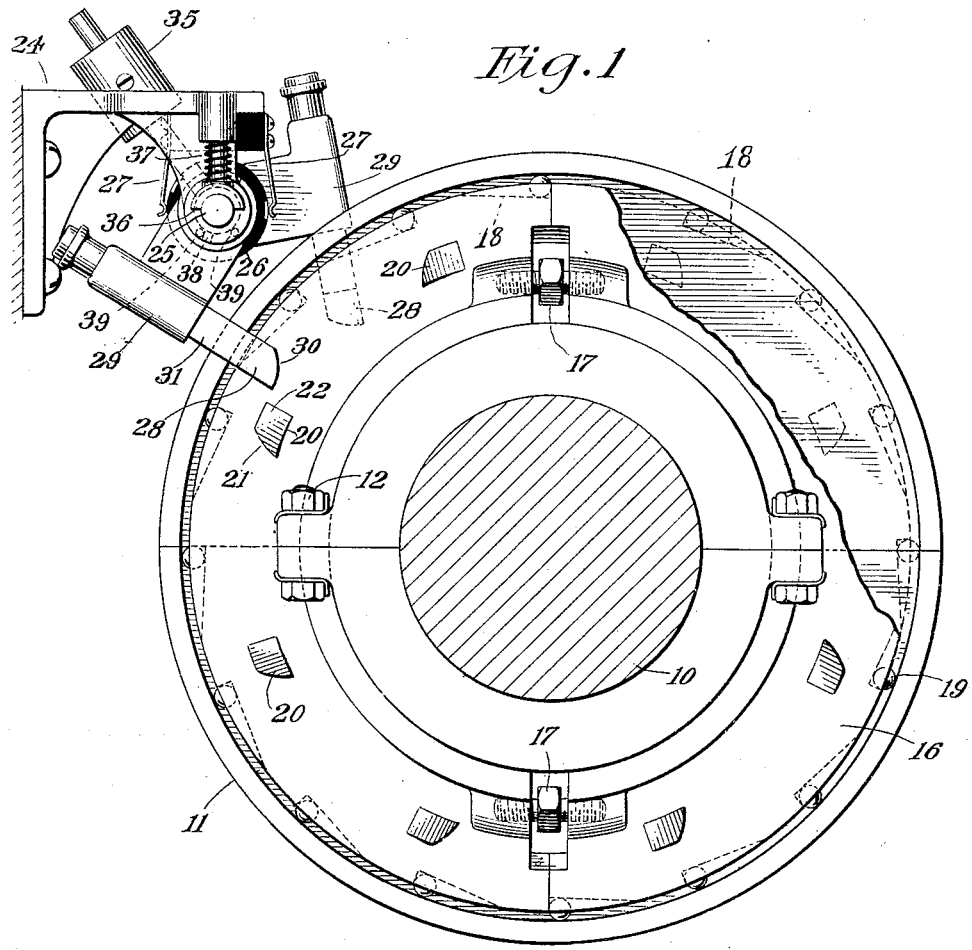
Figure 2:
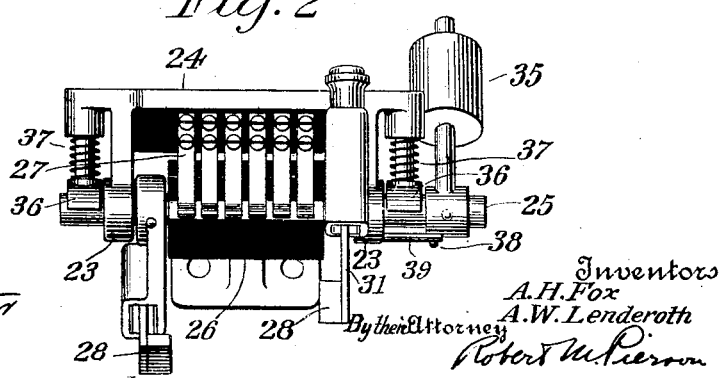

Of the accompanying drawings, Figure 1 represents a side elevation partly broken away and in section, showing a reversing-switch mechanism constructed according to our invention. Fig. 2 represents a front elevation of the switch. Fig. 3 represents a plan view of the mechanism shown in Fig. 1, with parts broken away and in section. Figs. 4 and 5 represent sectional views taken at right-angles, showing one of the switch-turning pins or fingers.

10 is a shaft which may represent a car-axle, on which a split drum 11 is clamped by means of the hub bolts 12. This drum has a web 13, two cylindrical hub portions 14 on opposite sides of said web, and two peripheral flanges 15 with internal driving surfaces. On opposite sides of the web 13 are two loose disks 16 having a bearing on the hub portions of the drum, each disk being split and having its halves connected by right-and-left threaded bolts 17. These disks may be confined against lateral separation from the web by the walls of a casing (not here shown) through which the hub-ends of the drum project. The edges of the disks are formed with notches 18 whose bottoms incline in opposite directions in the respective disks, and in said notches are mounted spherical rollers or balls 19 which coöperate with the cylindrical internal driving surfaces of the flanges 15. In this way two oppositely-acting one-way automatic clutches are provided for driving the respective disks 16, one disk being driven and the other loose when the axle 10 rotates one way, while the first-said disk is loose and the other driven when the axle rotates in the opposite way. On the side of each disk is a circular series of teeth 20 whose driving faces 21 are preferably curved like gear-teeth, while their side faces 22 slope into the faces of the disks. The driving faces of the teeth 20 are directed oppositely in the respective disks.

In bearings 23 on a bracket 24 is mounted a rock-shaft 25 parallel to the axle 10, and on said shaft is fastened the barrel 26 of the switch, against which bear suitable spring contacts or electrodes 27. The switch barrel is composed of insulating material with suitable inserts of metal, the metal or the insulating material being brought under the spring electrodes according to the position of the barrel. The form and connections of the switch contacts do not enter into the present invention, and we may employ any suitable type of switch or arrangement of connections. On opposite sides of the drum 11 are two fingers 28 mounted in holders 29 attached to the shaft 25, the acting faces 30 of these fingers being preferably curved like gear teeth and adapted to be engaged by the teeth 20 on the respective disks 16. We prefer to construct and mount these fingers so as to insure against their being jammed and broken, and hence we have made the stems 31 flat and laterally flexible so that the finger will yield to the inclined side faces 22 of the teeth on one of the disks which may get stuck and turn in the wrong direction. We have also mounted the rear portions of the stems slidingly in guides 32 on the holders 29 and provided rollers 33 to decrease the friction, and stiff springs 34 to keep the fingers normally projected, the said springs however being adapted to yield in case one of the fingers should, during reversal of the switch, come down against the outer face of one of the teeth 20. A weighted arm 35 is attached to the shaft 25 to counterbalance the fingers and their holders in order that gravity shall have no tendency to turn said shaft in either direction, and we have further shown friction shoes 36 held against the shaft by springs 37 to prevent said shaft from turning too easily. A pin 38 on the shaft, adapted to encounter either of two fixed stop-pins 39, serves to prevent overthrow.

In operation, let it be assumed that the shaft 10 and drum 11 are turning in a counter-clockwise direction as viewed in Fig. 1, and that the switch parts connected with shaft 25 have the position shown. The disk 16 in the foreground will be driven through its ball-clutch from the flange of the drum, and the disk at the rear will be loose and stationary. Now when the axle reverses so as to rotate in a clockwise direction, the disk in the foreground is automatically released and stands still while the disk in the rear is driven in the same direction as the drum. The first one of its teeth 20 encountering the finger 28 shown at the rear in dotted lines, displaces said finger and thereby turns the shaft 20 so as to rearrange the electrical connections in the desired manner for the reverse rotation of the axle. The finger 28 which is thus displaced is moved just beyond the path of the revolving series of teeth on the rear disk 16, and hence there is no contact or wear between said parts during the continued rotation of that disk. The finger on the front side at the same time is moved into the path of the teeth on the front disk and is ready to be engaged and displaced by one of said teeth when the direction of the axle is again reversed, so as to drive the front disk.

We claim,—

1. The combination of an electrical switch having a shiftable member, a reversible shaft, and connections between said shaft and switch-member including one-way clutches which automatically engage in opposite directions.

2. The combination of an electrical switch having a shiftable element, a reversible shaft, a pair of disks on said shaft for shifting said element in opposite ways, and one-way automatic clutches for connecting the one or the other of said disks to the shaft according to the latter's direction of rotation.

3. The combination of a reversible shaft, a pair of disks thereon connectible with the shaft by oppositely-acting one-way clutches and having oppositely-acting teeth, a parallel switch shaft, and a pair of fingers on said switch-shaft adapted to be engaged and displaced by the teeth of the respective disks.

4. The combination of a switch-shaft substantially balanced against rotation by gravity and having a pair of fingers, a reversible driving-shaft, members on said shaft adapted to engage and displace said fingers so as to turn said switch-shaft to one or the other of two positions, and automatic connecting and disconnecting means between said members and the reversible shaft.

5. The combination of a reversible axle, a split drum clamped thereon, a pair of separate disks loose on said drum and reversely-connectible therewith by one-way automatic clutches, said disks having teeth, and a switch having a shiftable element adapted to be operated by said teeth.

6. The combination of a reversible shaft, toothed driving-disks connectible therewith by reversely-acting one-way clutches, a parallel switch-shaft, and a pair of fingers on said switch-shaft adapted to be engaged by the teeth on the disks and yieldingly mounted to prevent damage by jamming.

7. The combination of a reversible driving-shaft, a parallel switch shaft, a finger on the latter mounted to yield in a direction substantially parallel to the shaft, and a member on the reversible shaft having a tooth adapted to displace said finger and rotate the switch-shaft when said member turns in one direction and having an inclined side face for acting on the finger if said member should move in the opposite direction.

8. The combination of a reversible shaft, a parallel switch-shaft having a finger-holder, a finger in said holder backed by a spring which permits the finger to yield in a direction substantially radial to the reversible shaft, and a driving disk on said reversible shaft having teeth for engaging said finger.

In testimony whereof we have hereunto set our hands in the presence of two subscribing witnesses, this 10th day of June, 1913.

AUSTEN H. FOX.
ARNOLD W. LENDEROTH.

Witnesses:
G. BLAKE,
WILLIAM J. DODGE.

---

Copies of this patent may be obtained for five cents each, by addressing the "Commissioner of Patents, Washington, D. C."